Sept. 25, 1951 W. A. ENDTER 2,569,044
LATCH SAFETY CATCH
Filed Oct. 18, 1946 2 Sheets-Sheet 1
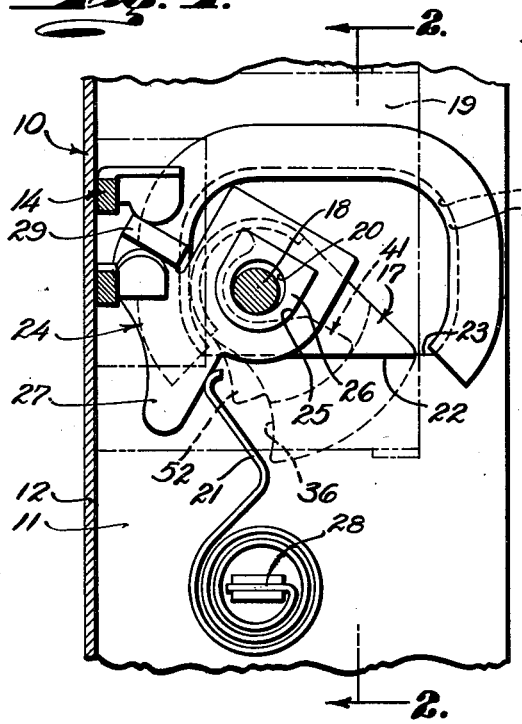
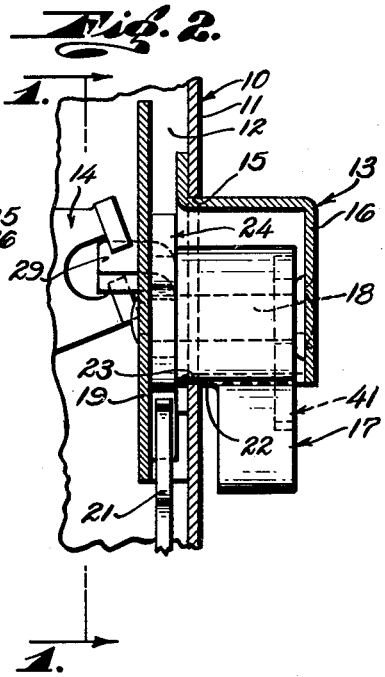
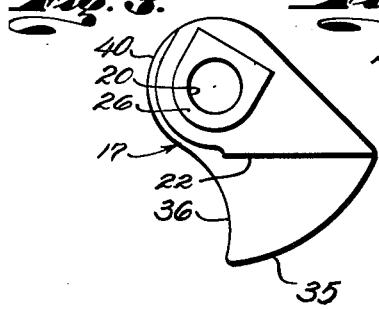
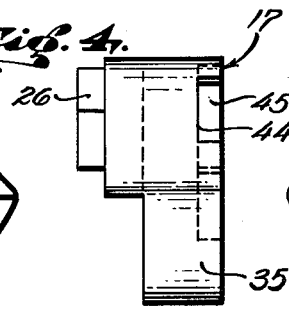
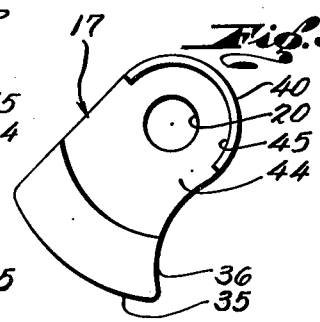
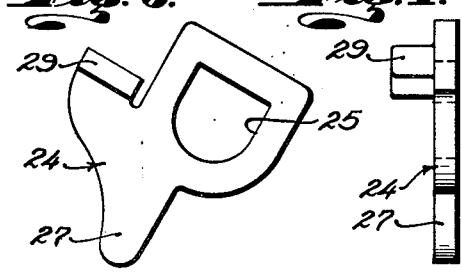
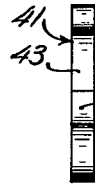
INVENTOR.
WALDEMAR A. ENDTER
BY
ATTORNEY

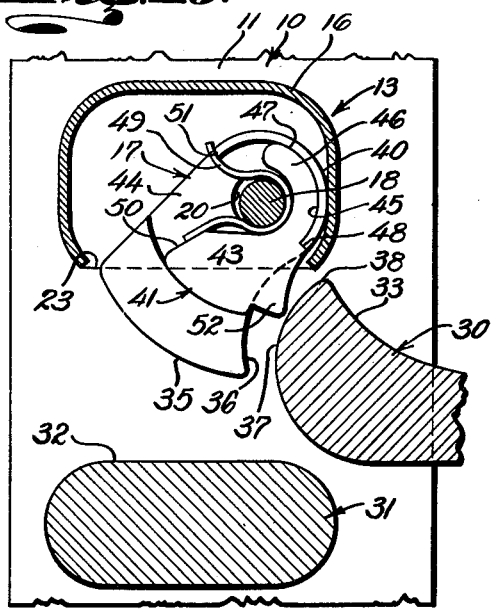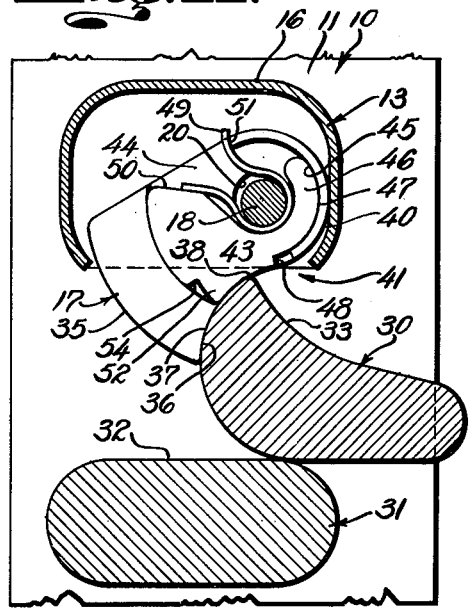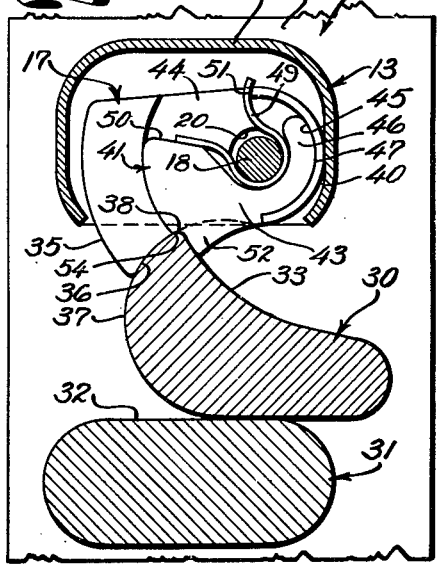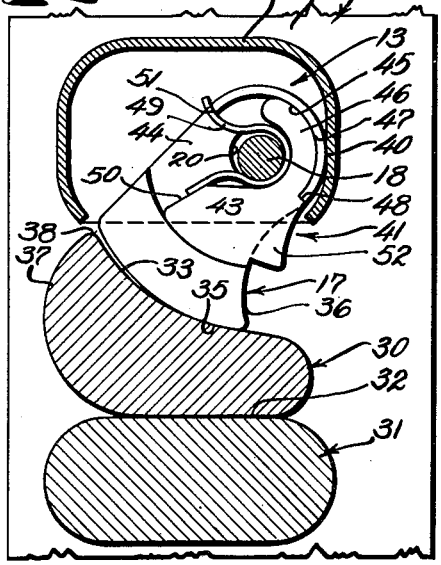

UNITED STATES PATENT OFFICE 2,569,044

LATCH SAFETY CATCH

Waldemar A. Endter, Long Beach, Calif.

Application October 18, 1946, Serial No. 703,940

5 Claims. (Cl. 292—52)

This invention relates to latch mechanisms embodying the usual combination of a bolt and keeper carried individually by relatively stationary and movable members, typically the door and pillar of an automobile body. More particularly, the invention is concerned with an improved safety catch having the general function of releasably securing the closure against opening, in advance of latched engagement of the bolt with its keeper.

Various forms of safety catch devices have been proposed and used, some employing a catch element on the keeper carrying member, and others having the safety catch carried by the bolt carrying member, and in functional association with the bolt actuating parts of the latch. The present safety catch device is of this latter type, but differs characteristically from prior devices in a number of respects according to the following stated objects of the invention.

One general object is to provide a safety catch element movable with the bolt, and particularly a swinging type bolt, about an axis of the bolt rotation, so that the parts have sequential latching action in that the safety catch element first engages a keeper part to hold the closure against opening, and the bolt then moves into latched condition in its keeper.

A further object is to provide a bolt and safety catch combination in which both the bolt and catch element engage and are retained by the same keeper, and particularly by an overriding action and movement along or against the same surface of the keeper.

The invention contemplates a further and distinct departure from prior practices in having the safety catch element carried by the bolt itself, and capable of relative movement thereto so that while having a common mounting, capable of simple and compact construction and arrangement, the catch element and bolt are independently operable for their individual functions.

In its more specific aspects the invention embodies various additional features and details relating to the particular manner in which the safety catch element may be accommodated by or within the bolt, and spring urged to resist relative movement between the bolt and element. All these, as well as the above stated objects and details of a typical and preferred embodiment will be understood from the following description of the accompanying drawings, in which:

Fig. 1 is a section taken on line 1—1 of Fig. 2, showing the bolt assembly as viewed at the inside of the case;

Fig. 2 is a section on line 2—2 of Fig. 1;

Figs. 3 and 4 are end and side views, respectively, of the bolt;

Fig. 5 is a right hand end view of the bolt;

Figs. 6 and 7 are end and side views, respectively, of the bolt control part;

Figs. 8 and 9 are edge and side views, respectively, of the safety catch; and

Figs. 10 to 13 are views showing the relationship of the bolt, safety catch and keeper parts in progressive stages of movement of the closure to latched position.

Having features of particular advantage as applied to automobile door latch mechanisms, the invention will be described typically as embodied in that type of latch. For adaptation to an automobile door, the mechanism as shown in Figs. 1 and 2, is mounted in a case structure 10 of the usual form comprising right angle flanges 11 and 12, the former of which carries the bolt and shaft assembly 13 at the door edge, flange 12 carrying an appropriate bolt control and locking mechanism, for example having the construction and operation disclosed in my copending application Serial No. 672,582, filed May 27, 1946, on "Floating Bolt Latch." For present purposes, the showing of the bolt control mechanism is confined to the illustration of a bifurcated arm 14 having the later described connection and functional association with the bolt, it being understood that arm 14 may be of a swinging type adapted to be actuated by the usual inside and outside operators, all as more particularly dealt with in the above mentioned copending application. Opening 15 in flange 11 contains the outwardly propjecting bolt-containing bracket or semi-housing 16.

The bolt 17, see particularly Figs. 3 to 5, is mounted within the housing 16 for pivotal or swinging movement, and in accordance with this particular embodiment typifying the invention, also for bodily movement. A pin 18 terminally secured within the housing and the stationary deck plate 19, extends through an opening 20 in the bolt, the size or diameter of the opening being sufficiently larger than the pin diameter to permit bodily or floating movement of the bolt within the case. Thus except as the bolt may be restrained by spring 21 and the housing 16, it is freely displaceable, the pin 18 serving merely as a retainer and guide. As illustrated in Fig. 1, the bolt extends through the case flange 11 and has a shoulder 22 engageable against the bottom horizontal edge 23 of opening 15 to limit rotation of the bolt in a latching direction.

The bolt has an associated control part, which for convenience of manufacture and assembly preferably is made as a separate element 24, see Figs. 6 and 7, carried by the inner end of the bolt. The control part has an opening 25 which receives the correspondingly shaped end projection 26 on the bolt so that the parts are interengaged against relative rotation. The element 24 carries an arm 27 engaged by coil spring 21 mounted on 28 on the case flange 11, the spring exerting a constant thrust resisting anti-latching rotation of the bolt, and tending, in the latched positions of the bolt, to progressively advance the latter into or along the keeper. Element 24 carries a second, laterally projecting arm or lug 29 engaged by arm 14 of the control mechanism to swing the bolt out of the keeper, i. e. in an anti-latching direction.

Assuming the described parts to be carried by the door or closure, the stationary door pillar carries a keeper 30 adapted to be received between the bolt assembly 13 and the door-carried lug 31 to effect a dove-tailed latched relation of the parts, the bolt 17 being received within the keeper, see Fig. 13, and exerting against the latter a thrust forcing the keeper 30 into tight engagement with the lug surface 32. The keeper 30 has a concavely curved bolt engaging face 33 which has a camming relation to the curved bolt surface 35, such that latching advancement of the bolt along surface 33 tends to bodily displace the bolt, as permitted by its loose placement about the pin 18.

Assuming the door to be open with the bolt position established by the engagement of its surface 22 against edge 23 of the case opening, as the closure is swung shut, the bolt face 36 engages the end 37 of the keeper, displacing the bolt upwardly until it overrides the top rounded edge 38 of the keeper, whereupon spring 21 acts to advance the bolt into the keeper. As the closure is shut further, the bolt surface 35 advances along the keeper surface 33, spring 21 exerting a progressive take-up action tending to crowd the door against the usual cushion as the bolt approaches the home position shown in Fig. 13. By reason of the camming relation of the keeper and bolt surfaces 33 and 35, the bolt is bodily displaced to bring its curved surface 40 into engagement with a stationary abutment presented by the inside surface of the housing 16. Accordingly, in all of its latched positions, the bolt serves to block opening movement of the door by reason of the interposition of the bolt between the pillar-carried keeper 30 and the door-carried abutment 16.

The present invention is concerned particularly with an improved safety catch device, generally indicated at 41, and distinguished from the usual or conventional safety catch devices in that the catch element is carried by the bolt itself. Referring to Figs. 8 and 9, the catch element 43 is shaped for accommodation within recess 44 in the end face of the bolt, the outer extremity of the recess being defined by curved shoulder 45 on the bolt. The element 43 has a curved projection or arm portion 46, the surface 47 of which engages and is curved in conformity with the bolt shoulder 45. Rotation of the element 43 relative to the bolt in one direction, is arrested by engagement of the element shoulder 48 against the lower end of shoulder 45. Arm 46 is spaced about the pin 18 to accommodate a hair pin spring 49 one end of which bears against the catch element surface 50, the other extremity of the spring engaging the end of shoulder 45 at 51. As shown in Fig. 10, normally portion 52 of the catch element projects forwardly beyond curved surface 36 of the bolt so as to engage the keeper 30 in advance of the bolt engagement therewith.

Assuming the door and bolt 17 to be swung from the open position of Fig. 10 in a closing direction, portion 52 of the safety catch first engages the keeper, causing the element 43 to be swung within the bolt recess 44 against the resistance of spring 49 to the position of Fig. 11 in which the curved safety catch and bolt surfaces both engage and conform with the curved end surface 37 of the keeper. Upon further closing of the door, the safety catch projection overrides the top of the keeper and, under the influence of spring 49, snaps down into the keeper to the position of Fig. 12, downward swinging of the catch element beyond the position illustrated being arrested by the engagement of shoulder 54 against the top of the keeper. The door thus becomes retained by the safety catch in an initial latched position, in which the door is securely held against inadvertent release of the latch by the combined effects of the spring 49 acting to keep the element 43 thrust into the keeper, and the transmission of any reactive thrust from the keeper through the element against the bolt surface 45.

Upon further closing movement of the door, the bolt 17 overrides the high point 38 of the keeper and is thrust by the action of spring 21 into latched condition within the keeper, the bolt ultimately assuming the home position illustrated in Fig. 13. The normal position of the safety catch element relative to the bolt is reestablished by the engagement of shoulder 48 against the bolt shoulder 45. As will be understood, upon retraction of the bolt from the keeper by downward movement of arm 14 in engagement with lug 29 of the bolt control part 24, the safety catch element swings with and retains its normal position within and relative to the bolt.

I claim:

1. A latch mechanism applicable to a stationary member and a movable closure member, comprising a shaft, a bolt mounted for swinging movement on one of said members about the shaft and adapted to override and swing into latched engagement with a keeper on the other of said members, a swinging safety catch element of radially shorter dimension than the bolt carried by and within a recess in the bolt and extending therein partly about said shaft, said element being movable relative to the bolt and operable to override and move into said keeper in advance of latched engagement of the bolt in the keeper to hold the closure member against opening, and a spring carried within the bolt and resisting relative movement of said element relative thereto.

2. A latch mechanism applicable to a stationary member and a movable closure member, comprising a bolt mounted for swinging movement on one of said members and adapted to override and swing into latched engagement with a keeper on the other of said members, a swinging safety catch element carried by the bolt within a recess therein and rotatable with said bolt about a common axis, said element being rotatable relative to the bolt and operable to override and move into said keeper in advance of latched engagement of the bolt to hold the closure member against opening, stop shoulders on said element and bolt engageable to arrest their relative rotation in one direction, and yielding means resisting their relative rotation in an opposite direction.

3. A latch mechanism applicable to a stationary member and a movable closure member, comprising a bolt mounted for swinging movement about an axis on one of said members and engageable with a keeper on the other of said members, a safety catch element carried by the bolt and contained within a recess therein shaped to accommodate rotation of said element within and relative to the bolt about said axis, said element being engageable with said keeper to hold the closure member against opening, said bolt and element having keeper engaging faces rotatable together about said axis, and yielding means carried by said bolt and said element for resisting said relative rotation.

4. A latch mechanism applicable to a stationary member and a movable closure member, comprising a bolt mounted for swinging movement on one of said members and adapted to override and swing into latched engagement with a keeper on the other of said members, a swinging safety catch element carried by the bolt within a recess therein and rotatable with said bolt about a common axis, said element being rotatable relative to the bolt and operable to override and move into said keeper in advance of latched engagement of the bolt to hold the closure member against opening, and stop shoulders on said element and bolt engageable to arrest their relative rotation in one direction.

5. In a latch mechanism for a stationary member and a movable closure member, the combination comprising: a shaft secured to one of the members and extending normal to the direction of relative movement between said members; a bolt mounted for swinging movement on said shaft and adapted to override and swing into latched engagement with a keeper on the other of the members; means defining a recess in one side of said bolt having a pair of opposed arcuate concentric walls extending about said shaft with their ends in spaced relation; a safety catch element of shorter radial dimension than said bolt mounted in said recess for swinging movement with and relative to said bolt, said element having arcuate peripheral portions complementary to said walls and a portion projectable beyond the periphery of the bolt for engagement with the keeper; and a spring engaged with an end of one of said arcuate walls and with said element for maintaining said element in position wherein the keeper-engageable portion thereof projects beyond the periphery of said bolt.

WALDEMAR A. ENDTER.

REFERENCES CITED

The following references are of record in the file of this patent:

UNITED STATES PATENTS

| Number | Name | Date |
| --- | --- | --- |
| 448,298 | Lecellier | Mar. 7, 1891 |
| 1,283,350 | Stiles | Oct. 29, 1918 |
| 1,993,659 | Goodman et al. | Mar. 5, 1935 |
| 2,134,314 | O'Donnell | Oct. 25, 1938 |
| 2,159,581 | Anderson | May 23, 1939 |
| 2,301,221 | Marple | Nov. 10, 1942 |
| 2,310,549 | Roethel | Feb. 9, 1943 |
| 2,334,806 | Dall | Mar. 21, 1944 |
| 2,427,511 | Roethel | Sept. 16, 1947 |